Nov. 30, 1937. U. CIAMBERLINI 2,100,835
FLEXIBLE TUBE
Filed Sept. 20, 1935
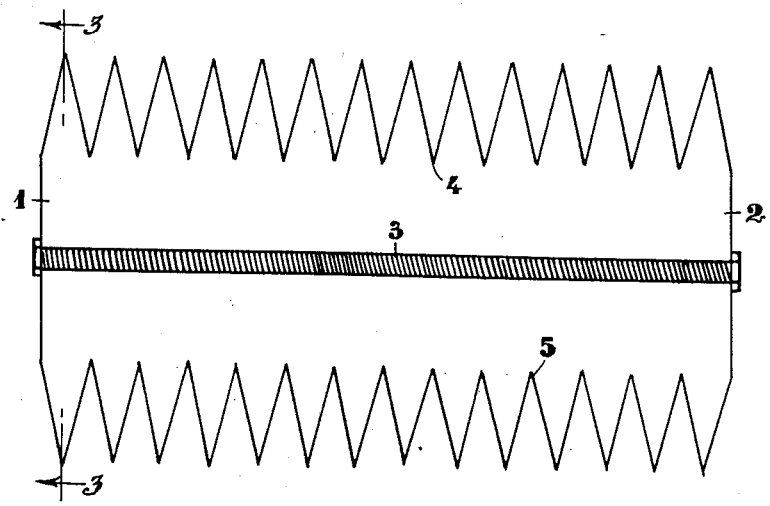
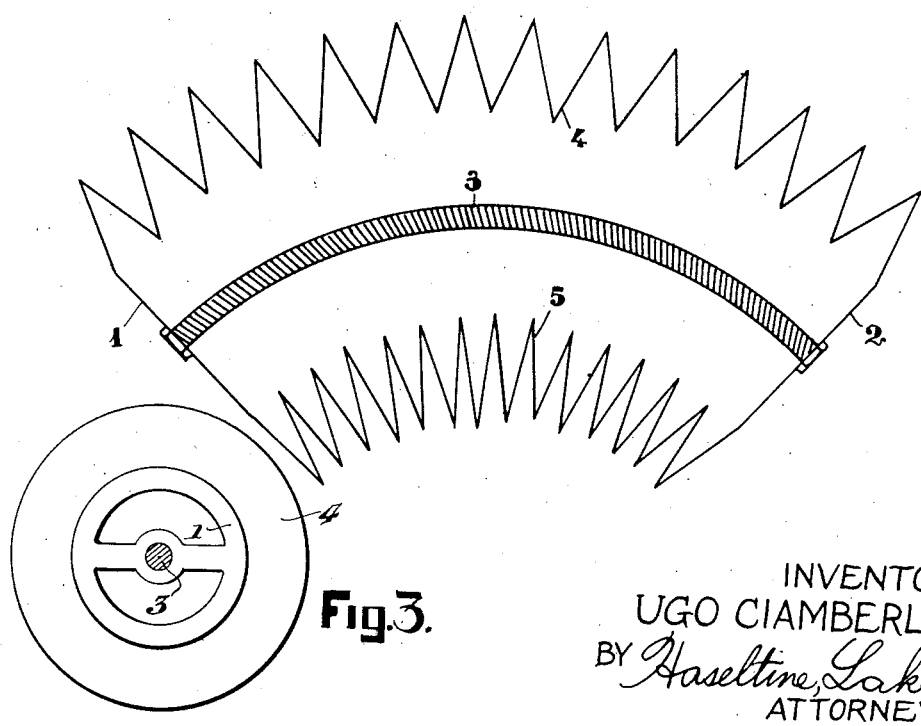
INVENTOR
UGO CIAMBERLINI
BY Haseltine, Lake & Co.
ATTORNEYS Patented Nov. 30, 1937

2,100,835

UNITED STATES PATENT OFFICE 2,100,835

FLEXIBLE TUBE

Ugo Ciamberlini, Rome, Italy

Application September 20, 1935, Serial No. 41,404
In Italy September 27, 1934

2 Claims. (Cl. 138—49)

It is known that a cylindrical tube made of flexible material such as cloth, metals and the like, and containing in its interior a liquid or gaseous fluid either at rest or in movement, offers a strong resistance to its bending when the pressure of the fluid contained in it exceeds the pressure existing in the external medium in which the tube is immersed, said resistance increasing with the increase in the value of the fluid pressure.

The present invention has for its object to render flexible the tubes subjected to the pressure of a fluid contained in their interior, with a very small strain, which is practically independent of the value of the internal pressure.

To obtain this object, according to the invention, the tube is formed as a cylindrical bellows, which may be made with metallic sheetings or plates, formed with a series of conical rings inclined alternately in opposite directions, and connected along their two edges, so as to form finally a bellows similar to a folded cloth, having a rectangular section, such as used in concertinas, and in photographic cameras.

The said bellows differs however very substantially from that used in the last mentioned devices, inasmuch as, while this latter is extensible, viz. with a variable volume, the bellows used in the present invention is flexible, but is not extensible. In fact in the bellows, according to the invention, two open end plates or covers are applied to the ends thereof which provide a communication of the tube with other parts, two points of said end plates or open supports located on a diameter thereof and at equal distances from their centre, being connected by means of two inextensible but flexible shafts or cables, maintaining their position when the tube is deflected in a plane at right angle with the plane comprising said shafts or cables and the neutral centre of the tube, so that the internal volume of the tube both in the straight and bent positions remains practically constant, and the tube offers little resistance to flexion, in relation to the pressure of the fluid contained in it.

Flexible tubes of this character may be used chiefly to connect portions of rigid tubes adapted to be moved one with respect to the other in planes normal to each other, which would otherwise necessitate the insertion between them of a tight fitting spherical joint. Applications of the tube, according to the invention, are for example the connections between the successive lengths of very long hydrant tubes into which the water flows under pressure; in the union between the different parts of a stratosphere navigator's suit in which case the internal fluid under pressure is air in the state of rest, and so on.

In the annexed drawing, showing schematically and by way of example, a form of construction of the object of the invention, Fig. 1 shows in sectional elevation a flexible tube having its neutral axis in a straight position.

Fig. 2 shows in sectional elevation the same tube bent circularly in the plane of the drawing.

Fig. 3 is a section of the tube as taken on line 3—3 in Fig. 1.

As shown in the drawing, the tube is formed with a succession of truncated conical shaped rings 4—5, made of thin metal sheets or plates, suitably connected and alternatively inclined in opposite directions, forming a perfectly air-tight casing, which in the example shown in the drawing is closed at the two ends with the two end plates 1—2, the distance between which being constantly assured by means of the flexible and inextensible cables 3 the ends of which are fixed respectively to two points located in a plane normal to said end plates and passing through the neutral axis of the tube.

When the tube is bent as shown in Fig. 2, its upper periphery 4 assumes a slight distended position, while its lower periphery 5 becomes slightly compressed, this deformation not causing however any variation in the internal volume of the tube and consequently no supplementary effort is required for producing inflection when the internal pressure increases.

In order to produce a very pliable joint, the two cable shafts 3 may be located in positions adjoining very closely the inner surfaces of the walls of the tube, this provision being especially adapted for use for divers' or high altitude navigators' suits and the like.

It is to be understood that the invention has been illustrated and described by way of example, and that many variations may be brought to its various parts without thereby departing from its main principle. Thus, for example, the cross section of the bellows, instead of being circular, may be rectangular or polygonal. The connecting cable may be multiple, consisting of more than two cables. Manifestly, variations may be resorted to and features used without others.

Having now fully described my invention, I claim:

1. A flexible tube of the character described, comprising a plurality of truncated conical ring sections secured together in alternate positions to constitute a bellows member, end plate members having open portions respectively secured to the conical rings constituting the opposite ends of said bellows member, and a flexible inextensible cable within said tube secured at its opposite ends to said end plate members, causing the internal volume of the tube to remain constant when bent and ensuring flexing of the tube when the pressure therein exceeds the pressure on the exterior of said tube.

2. A flexible and pliable tube of the character described comprising a plurality of truncated conical metallic ring sections secured together and alternately disposed in opposite directions to constitute a flexible bellows, end plate members having open portions respectively and rigidly secured to the conical rings at the opposite ends of said bellows, and a flexible inextensible cable member within said tube and secured at its opposite ends to said end plate members and disposed substantially axially of said bellows to prevent expansion while permitting flexing of the latter, causing the internal volume of the tube to remain constant when bent and the tube to flex readily when the fluid pressure therein exceeds the fluid pressure existing in an external medium in which the tube is disposed.

UGO CIAMBERLINI.